US 12,270,476 B2

(12) United States Patent
Urushiyama et al.

(10) Patent No.: US 12,270,476 B2
(45) Date of Patent: Apr. 8, 2025

(54) CAPACITY CONTROL VALVE

(71) Applicant: EAGLE INDUSTRY CO., LTD., Tokyo (JP)

(72) Inventors: Keichi Urushiyama, Tokyo (JP); Kohei Fukudome, Tokyo (JP); Masahiro Hayama, Tokyo (JP); Toshinori Kanzaki, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/919,731

(22) PCT Filed: Apr. 15, 2021

(86) PCT No.: PCT/JP2021/015600
§ 371 (c)(1),
(2) Date: Oct. 18, 2022

(87) PCT Pub. No.: WO2021/215347
PCT Pub. Date: Oct. 28, 2021

(65) Prior Publication Data
US 2023/0160477 A1    May 25, 2023

(30) Foreign Application Priority Data
Apr. 22, 2020    (JP) .................... 2020-076025

(51) Int. Cl.
*F16K 1/42*    (2006.01)
*F16K 1/36*    (2006.01)
(Continued)

(52) U.S. Cl.
CPC ............... *F16K 1/425* (2013.01); *F16K 1/36* (2013.01); *F16K 27/029* (2013.01);
(Continued)

(58) Field of Classification Search
CPC ... F16K 1/425; F16K 1/36; F16K 1/42; F16K 25/005; F16K 31/0634; F16K 31/0655;
(Continued)

(56) References Cited

U.S. PATENT DOCUMENTS 3,765,644 A    10/1973    Zeuner ................ F16K 31/0655
4,291,860 A    9/1981    Bauer ................ F16K 31/0655
(Continued)

FOREIGN PATENT DOCUMENTS

CN    2869383    2/2007    .............. F04B 49/22
CN    102384056    3/2012    .............. F04B 27/14
(Continued)

OTHER PUBLICATIONS

European Official Action issued in related Application No. 20795023.9, dated Jan. 30, 2024, 6 pages.
(Continued)

*Primary Examiner* — Marina A Tietjen
(74) *Attorney, Agent, or Firm* — HAYES SOLOWAY P.C.

(57) ABSTRACT

Provided is a capacity control valve that can be produced with good workability and at a low cost. A capacity control valve includes: a valve housing in which a flow passage is formed; and a valve body disposed inside the valve housing and driven by a solenoid. A valve seat member having a tubular shape and including a valve seat on which the valve body is seatable is press-fitted into the valve housing, and at least the valve seat of the valve seat member is harder than the valve housing.

3 Claims, 9 Drawing Sheets

(51) Int. Cl.
*F16K 27/02* (2006.01)
*F16K 31/06* (2006.01)
*B60H 1/00* (2006.01)

(52) U.S. Cl.
CPC ...... *F16K 31/0634* (2013.01); *F16K 31/0644* (2013.01); *F16K 31/0655* (2013.01); *B60H 1/00485* (2013.01)

(58) Field of Classification Search
CPC .............. F16K 27/029; F16K 31/0644; B60H 1/00485; F04B 2027/1813; F04B 2027/1827; F04B 2027/1859; F04B 2027/1877; F04B 27/1804; F04B 27/18
See application file for complete search history.

(56) References Cited

U.S. PATENT DOCUMENTS

| | | | |
|---|---|---|---|
| 5,022,629 A | 6/1991 | Tibbals | B05B 1/3053 |
| 5,076,538 A | 12/1991 | Mohr | B60T 15/028 |
| 5,199,855 A | 4/1993 | Nakajima | F04C 28/14 |
| 5,277,552 A | 1/1994 | Higuchi | F04B 27/1804 |
| 5,326,079 A * | 7/1994 | Ferrando | F16K 1/425 |
| | | | 251/359 |
| 5,401,087 A | 3/1995 | Goossens | F16J 15/56 |
| 5,503,184 A | 4/1996 | Reinartz | B60T 8/367 |
| 6,142,445 A | 11/2000 | Kawaguchi | F16K 31/0613 |
| 6,217,292 B1 | 4/2001 | Ota | F04B 27/1804 |
| 6,234,763 B1 | 5/2001 | Ota et al. | 417/222.2 |
| 6,244,159 B1 | 6/2001 | Kimura et al. | F01B 3/02 |
| 6,250,600 B1 | 6/2001 | Kumagai | G05D 16/0619 |
| 6,350,106 B1 | 2/2002 | Shimizu | F04B 27/1804 |
| 6,398,516 B1 | 6/2002 | Kawaguchi et al. | 417/222.2 |
| 6,443,708 B1 | 9/2002 | Hirota | F04B 27/1804 |
| 6,481,976 B2 | 11/2002 | Kimura | F04B 27/1804 |
| 6,585,494 B1 | 7/2003 | Suzuki | F25B 9/008 |
| 6,644,621 B2 | 11/2003 | Ji | B60T 13/686 |
| 6,772,990 B2 | 8/2004 | Sasaki et al. | F04B 49/00 |
| 6,893,215 B2 | 5/2005 | Kuwabara et al. | F01D 25/26 |
| 6,976,665 B2 | 12/2005 | Seitz | B60T 8/363 |
| 7,014,427 B1 | 3/2006 | Hirota | 417/218 |
| 7,987,871 B2 | 8/2011 | Cho | F16K 31/0627 |
| 8,418,723 B2 | 4/2013 | Tsuchiya | F16K 31/0655 |
| 8,550,427 B2 | 10/2013 | Yoshida | B60T 8/363 |
| 9,334,978 B2 | 5/2016 | Lappan | F04B 2/3442 |
| 9,581,149 B2 | 2/2017 | Ota et al. | F04B 27/1804 |
| 9,651,037 B2 | 5/2017 | Sakakibara | F04B 1/26 |
| 10,077,849 B2 | 9/2018 | Iwa et al. | F16K 31/06 |
| 10,174,860 B2 | 1/2019 | Noda | F16K 31/0655 |
| 10,316,975 B2 | 6/2019 | Fangauer | F16K 1/38 |
| 10,364,897 B2 * | 7/2019 | Vu | F16K 1/54 |
| 10,781,804 B2 | 9/2020 | Higashidozono | F04B 27/18 |
| 10,823,162 B2 | 11/2020 | Kume et al. | F04B 27/18 |
| 10,837,431 B2 | 11/2020 | Tonegawa et al. | F04B 27/18 |
| 10,907,624 B2 | 2/2021 | Kume et al. | F04B 27/18 |
| 11,215,293 B2 | 1/2022 | Fukuda | F04B 53/10 |
| 11,231,111 B2 * | 1/2022 | Hurst | F04B 53/102 |
| 11,320,061 B2 | 5/2022 | Nishimura et al. | F16K 31/06 |
| 11,480,166 B2 | 10/2022 | Hayama | F04B 27/10 |
| 11,603,832 B2 | 3/2023 | Higashidozono et al. | F04B 27/18 |
| 2002/0031432 A1 | 3/2002 | Ota et al. | F04B 1/26 |
| 2002/0098091 A1 | 7/2002 | Umemura | F04B 27/1804 |
| 2003/0019226 A1 | 1/2003 | Hirota | F04B 27/1804 |
| 2004/0060604 A1 | 4/2004 | Uemura | G05D 16/2024 |
| 2004/0091368 A1 | 5/2004 | Kanuma | F04B 27/1804 |
| 2004/0118140 A1 | 6/2004 | Umemura et al. | F25B 41/04 |
| 2005/0287014 A1 | 12/2005 | Umemura et al. | F04B 1/26 |
| 2006/0237552 A1 | 10/2006 | Umemura | F16K 31/0655 |
| 2007/0069576 A1 * | 3/2007 | Suzuki | B60T 8/363 |
| | | | 303/155 |
| 2007/0164244 A1 | 7/2007 | Kratzer | F16K 31/0658 |
| 2007/0267078 A1 | 11/2007 | Collet et al. | F15B 13/04 |
| 2008/0175727 A1 | 7/2008 | Umemura | F04B 27/1804 |
| 2010/0264342 A1 * | 10/2010 | Heyer | F16K 31/0655 |
| | | | 251/129.15 |
| 2011/0042605 A1 * | 2/2011 | Gyger | F16K 25/005 |
| | | | 251/359 |
| 2011/0091334 A1 | 4/2011 | Taguchi | F04B 27/1804 |
| 2012/0056113 A1 | 3/2012 | Tano et al. | F16K 31/12 |
| 2013/0291963 A1 | 11/2013 | Futakuchi et al. | B60H 1/00 |
| 2014/0369862 A1 | 12/2014 | Ota et al. | F04B 27/1804 |
| 2015/0044065 A1 | 2/2015 | Ota et al. | F04B 27/18 |
| 2015/0211502 A1 | 7/2015 | Ota et al. | F04B 7/0076 |
| 2015/0345655 A1 | 12/2015 | Higashidozono | F04B 27/1804 |
| 2016/0053755 A1 | 2/2016 | Taguchi | F04B 27/1804 |
| 2016/0186733 A1 | 6/2016 | Sugamura et al. | F04B 27/1804 |
| 2017/0175723 A1 | 6/2017 | Kume | F04B 27/1804 |
| 2017/0314700 A1 | 11/2017 | Iwanaga et al. | F16K 31/0675 |
| 2018/0056954 A1 * | 3/2018 | Kollmann | F16K 31/0658 |
| 2019/0226467 A1 | 7/2019 | Kume et al. | F04B 27/18 |
| 2019/0331249 A1 | 10/2019 | Borja | F16K 1/44 |

FOREIGN PATENT DOCUMENTS

| | | | |
|---|---|---|---|
| CN | 103671033 | 3/2014 | ............ F04B 39/08 |
| CN | 105736308 | 7/2016 | ............ F04B 39/00 |
| CN | 109416133 | 3/2019 | ............ F16K 31/06 |
| EP | 0255764 | 7/1987 | ............ F04B 1/28 |
| EP | 0945617 | 9/1999 | ............ F04B 27/18 |
| EP | 0945618 | 9/1999 | ............ F04B 27/18 |
| EP | 0980976 | 2/2000 | ............ F04B 27/18 |
| EP | 1091125 | 4/2001 | ............ F04B 27/18 |
| EP | 1098091 | 5/2001 | ............ F04B 27/18 |
| EP | 1052124 | 11/2002 | ............ B60H 1/32 |
| EP | 1279831 | 1/2003 | ............ F04B 27/18 |
| EP | 1375918 | 1/2004 | ............ F04B 27/18 |
| EP | 1512871 | 3/2005 | ............ F04B 27/18 |
| EP | 2952741 | 12/2015 | ............ F16K 31/06 |
| EP | 2963293 | 1/2016 | ............ F04B 27/10 |
| GB | 787961 | 12/1957 | ............ F04B 43/067 |
| JP | S62170466 U * | 10/1987 | |
| JP | 7-27049 | 1/1995 | ............ F04B 24/10 |
| JP | 2000-87849 | 3/2000 | ............ F04B 27/18 |
| JP | 2000-161234 | 6/2000 | ............ F04B 49/00 |
| JP | 3242496 | 10/2001 | ............ F04B 27/14 |
| JP | 2002-70732 | 3/2002 | ............ F04B 27/14 |
| JP | 2002201913 | 7/2002 | ............ F01D 11/00 |
| JP | 2003-322086 | 11/2003 | ............ F04B 49/00 |
| JP | 2004162856 | 6/2004 | ............ F16K 31/06 |
| JP | 3581598 | 7/2004 | ............ F04B 29/10 |
| JP | 2006-17087 | 1/2006 | ............ F04B 27/14 |
| JP | 2006-52648 | 2/2006 | ............ F04B 27/14 |
| JP | 3783434 | 3/2006 | ............ F04B 27/14 |
| JP | 2007177627 | 7/2007 | ............ F04B 27/14 |
| JP | 4100161 | 6/2008 | ............ F16H 61/00 |
| JP | 2011017381 | 1/2011 | ............ F16H 61/00 |
| JP | 2011-94554 | 5/2011 | ............ F04B 27/14 |
| JP | 2014-80927 | 5/2014 | ............ F04B 27/14 |
| JP | 2014-126025 | 7/2014 | ............ F04B 27/14 |
| JP | 2015-1168 | 1/2015 | ............ F04B 27/14 |
| JP | 2015-34510 | 2/2015 | ............ F04B 27/14 |
| JP | 201620682 | 2/2016 | ............ F04B 27/14 |
| JP | 5983539 | 8/2016 | ............ F04B 27/18 |
| JP | 2017-31834 | 2/2017 | ............ F04B 27/18 |
| JP | 2018-3884 | 1/2018 | ............ F16K 31/06 |
| JP | 2018179087 | 11/2018 | ............ F16K 31/06 |
| JP | 2019143781 | 8/2019 | ............ F16K 11/07 |
| WO | WO2005095796 | 10/2005 | ............ F04B 27/14 |
| WO | WO2012077439 | 6/2012 | ............ F04B 27/14 |
| WO | WO2015093502 | 6/2015 | ............ F04B 49/80 |
| WO | WO2017057160 | 4/2017 | ............ F04B 27/18 |
| WO | WO2018061380 | 4/2018 | ............ F04B 27/18 |
| WO | WO2019102909 | 5/2019 | ............ F16K 31/06 |
| WO | WO2018139476 | 11/2019 | ............ F16K 11/02 |
| WO | WO2013005538 | 1/2023 | ............ F16K 17/06 |

OTHER PUBLICATIONS

European Official Action issued in related Application No. 21792462.0, dated Feb. 15, 2024, 7 pages.

(56) References Cited

OTHER PUBLICATIONS

European Official Action issued in related Application No. 20785209.6, dated Mar. 15, 2024, 6 pages.
European Official Action issued in related Application No. 20868996.8, dated Oct. 2, 2023, 8 pages.
Official Action issued in related U.S. Appl. No. 17/603,291, dated Feb. 20, 2024, 10 pages.
Official Action issued in related U.S. Appl. No. 17/255,085, dated Mar. 28, 2024, 8 pages.
Advisory Action issued in related U.S. Appl. No. 17/599,474, dated Mar. 21, 2024, 6 pages.
Chinese Official Action issued in related Application No. 202080026977.4, dated Nov. 16, 2023 with translation, 18 pages.
Chinese Official Action issued in related Application No. 2020080026419.8, dated Dec. 1, 2023 with translation, 17 pages.
European Official Action issued in related Application No. 20795975.0, dated May 3, 2024, 6 pages.
Japanese Official Action issued in related Application No. 2021-516128, dated Dec. 5, 2023 with translation, 8 pages.
Korean Official Action issued in related Application No. 10-2021-7034329, dated Jan. 2, 2024 with translation, 12 pages.
Korean Official Action issued in related Application No. 10-2022-7037944, dated Apr. 1, 2024 with translation, 9 pages.
Official Action issued in related U.S. Appl. No. 17/600,529, dated Jan. 24, 2024, 15 pages.
Official Action issued in related U.S. Appl. No. 17/600,529, dated Apr. 18, 2024, 14 pages.
Official Action issued in related U.S. Appl. No. 17/600,529, dated Jun. 21, 2024, 12 pages.
Official Action issued in related U.S. Appl. No. 17/599,474, dated Dec. 14, 2023, 12 pages.
Official Action issued in related U.S. Appl. No. 17/603,291, dated Nov. 6, 2023, 11 pages.
Notice of Allowance issued in related U.S. Appl. No. 17/603,291, dated Apr. 17, 2024, 7 pages.
Notice of Allowance issued in related U.S. Appl. No. 17/603,284, dated Nov. 2, 2023, 9 pages.
Notice of Allowance issued in related U.S. Appl. No. 18/225,085, dated Jul. 17, 2024, 8 pages.
Official Action issued in related U.S. Appl. No. 17/600,529, dated Sep. 10, 2024, 13 pages.
Notice of Allowance issued in related U.S. Appl. No. 17/600,529, dated Sep. 3, 2024, 9 pages.

* cited by examiner

CAPACITY CONTROL VALVE

TECHNICAL FIELD

The present invention relates to a capacity control valve that variably controls capacity of a working fluid, for example, to a capacity control valve that controls a discharge amount of a variable displacement compressor used for an air conditioning system of an automobile according to pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve to be driven to open and close by electromagnetic force.

At the time of continuously driving the variable displacement compressor, the capacity control valve performs normal control in which energization is controlled by a control computer, a valve body is moved in an axial direction by electromagnetic force generated in a solenoid, and a CS valve provided between a control port through which a control fluid of the control pressure Pc passes and a suction port through which a suction fluid of the suction pressure Ps passes is opened and closed to adjust the control pressure Pc of the control chamber of the variable displacement compressor.

For example, a capacity control valve disclosed in Patent Citation 1 includes a valve housing including a control fluid supply chamber to which a control fluid is supplied, and a suction fluid supply chamber to which a suction fluid is supplied; and a valve body that can be driven by a solenoid to come into contact with and separate from a valve seat formed at an opening edge portion of a flow passage that provides communication between the control fluid supply chamber and the suction fluid supply chamber. The flow passage is opened and closed by the valve body to adjust the control pressure Pc of the control fluid supply chamber.

CITATION LIST

Patent Literature

Patent Citation 1: JP 5983539 B2 (PAGE 8, FIG. 3)

SUMMARY OF INVENTION

Technical Problem

In such a capacity control valve, since the valve body repeatedly comes into contact with and separates from the valve seat in the axial direction, the valve seat requires high wear resistance. In the capacity control valve of Patent Citation 1, the valve housing in which the valve seat is formed is made of a hard material, and not only it is difficult to perform boring, etc. for forming the flow passage, the valve seat, etc., but also the amount of use of the hard material is increased, thereby leading to an increase in production cost, which is a problem.

The present invention is conceived in view of such a problem, and an object of the present invention is to provide a capacity control valve that can be produced with good workability and at a low cost.

Solution to Problem

In order to solve the foregoing problem, according to the present invention, there is provided a capacity control valve including: a valve housing in which a flow passage is formed; and a valve body disposed inside the valve housing and driven by a solenoid. A valve seat member having a tubular shape and including a valve seat on which the valve body is seatable is press-fitted into the valve housing, and at least the valve seat of the valve seat member is harder than the valve housing, According to the aforesaid feature of the present invention, the valve seat member including the valve seat requiring wear resistance is configured separately from the valve housing, so that the valve seat is easily processed, and since the valve seat is made of a hard material harder than the material of the valve housing, the valve housing can be made of a low-cost material, so that the capacity control valve can be produced with good workability and at a low cost.

It may be preferable that the valve seat member is formed in a tapered shape that is tapered in a direction of press-fitting into the valve housing. According to this preferable configuration, the insertion of the valve seat member into the valve housing is guided by an outer peripheral surface of the valve seat member formed in a tapered shape, so that axis misalignment of the valve seat member with respect to the valve housing is suppressed and the accuracy of positioning of an axis of the valve seat with respect to the valve body is increased.

It may be preferable that the valve body has a contact portion that comes into contact with the valve seat and that has a curved surface shape. According to this preferable configuration, even when axis misalignment of the valve seat member with respect to the valve housing is generated, the contact portion of the valve body is reliably seatable on the valve seat.

It may be preferable that the contact portion of the valve body is a part of a spherical surface having a constant radius of curvature. According to this preferable configuration, even when axis misalignment of the valve seat member with respect to the valve housing is generated, the contact portion of the valve body is more reliably seatable on the valve seat.

It may be preferable that the valve housing is provided a receiving portion that receives an insertion end portion of the valve seat member. According to this preferable configuration, the insertion end portion of the valve seat member is brought into contact with the receiving portion, so that the progress of insertion of the valve seat member into the valve housing can be defined and sealing between the valve housing and the valve seat member can be improved.

DESCRIPTION OF EMBODIMENTS

Modes for carrying out a capacity control valve according to the present invention will be described below based on embodiments.

First Embodiment

Figure 1:
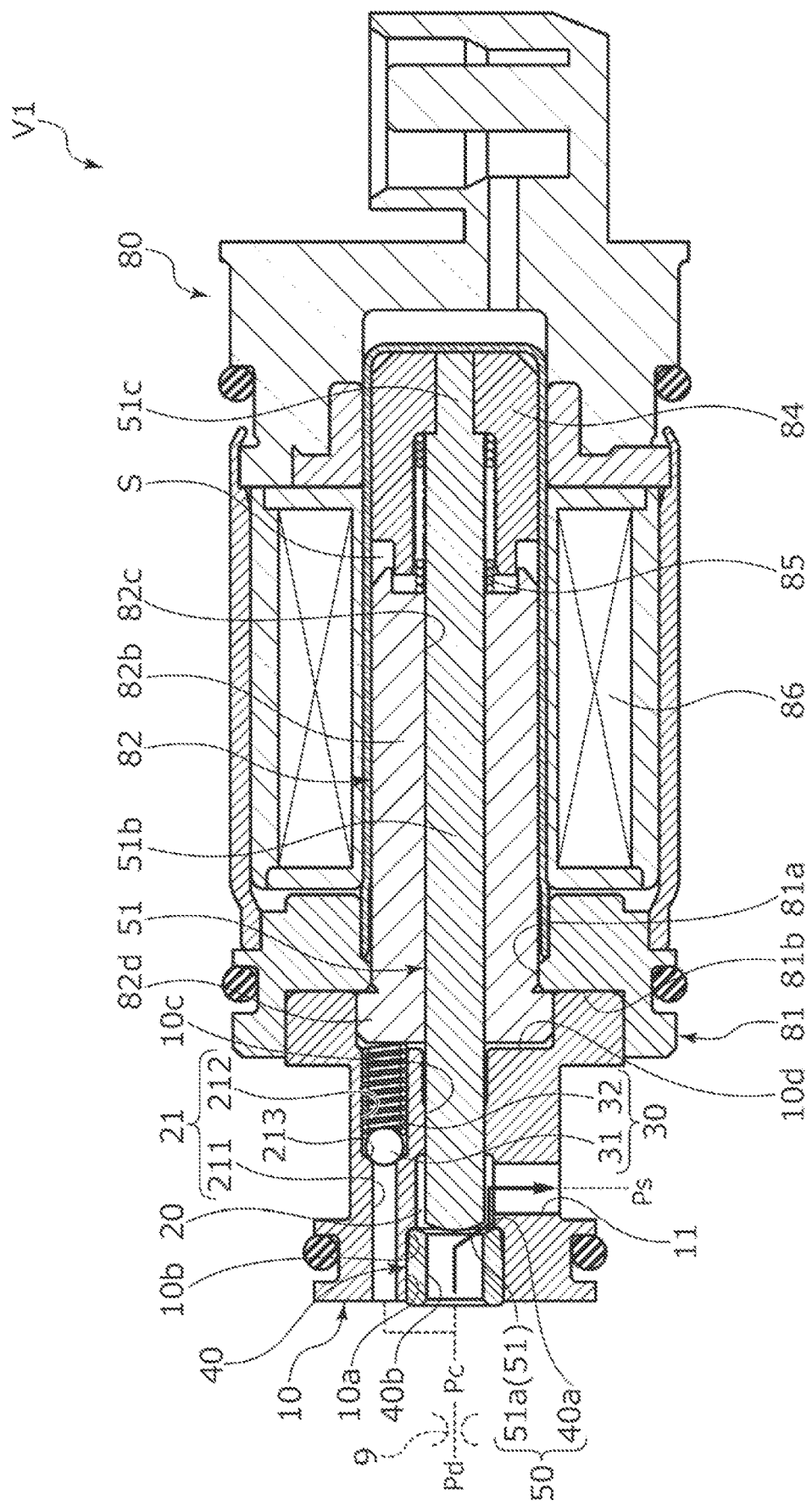
FIG. 1 is a cross-sectional view showing a state where a CS valve is opened in a non-energized state of a capacity control valve according to a first embodiment of the present invention.

A capacity control valve according to a first embodiment of the present invention will be described with reference to FIGS. 1 to 3. Hereinafter, a description will be given based on the assumption that the left and right sides when seen from the front side of FIG. 1 are left and right sides of the capacity control valve. In detail, a description will be given based on the assumption that the left side of the drawing sheet on which a valve housing 10 is disposed is the left side of the capacity control valve and the right side of the drawing sheet on which a solenoid 80 is disposed is the right side of the capacity control valve.

The capacity control valve of the present invention is assembled into a variable displacement compressor (not shown) used for an air conditioning system of an automobile, etc., and by variably controlling the pressure of a working fluid (hereinafter, simply referred to as a "fluid") that is a refrigerant, controls the discharge amount of the variable displacement compressor to adjust the air conditioning system to have a desired cooling capacity.

First, the variable displacement compressor will be described. The variable displacement compressor includes a casing including a discharge chamber, a suction chamber, a control chamber, and a plurality of cylinders. Incidentally, the variable displacement compressor is provided with a communication passage that allows direct communication between the discharge chamber and the control chamber, and the communication passage is provided with a fixed orifice 9 that adjusts and balances pressure between the discharge chamber and the control chamber (refer to FIGS. 1 and 2).

In addition, the variable displacement compressor includes a rotating shaft to be driven and rotated by an engine (not shown) installed outside the casing; a swash plate coupled to the rotating shaft so as to be tiltable by a hinge mechanism in the control chamber; and a plurality of pistons that are coupled to the swash plate and are reciprocatably fitted in the respective cylinders, and appropriately controls pressure in the control chamber while utilizing a suction pressure Ps of the suction chamber that suctions the fluid, a discharge pressure Pd of the discharge chamber that discharges the fluid pressurized by the pistons, and a control pressure Pc of the control chamber that houses the swash plate, by means of a capacity control valve V1 to be driven to open and close by electromagnetic force, to continuously change the tilt angle of the swash plate, and thus to change the stroke amount of the pistons and to control the discharge amount of the fluid.

Figure 2:
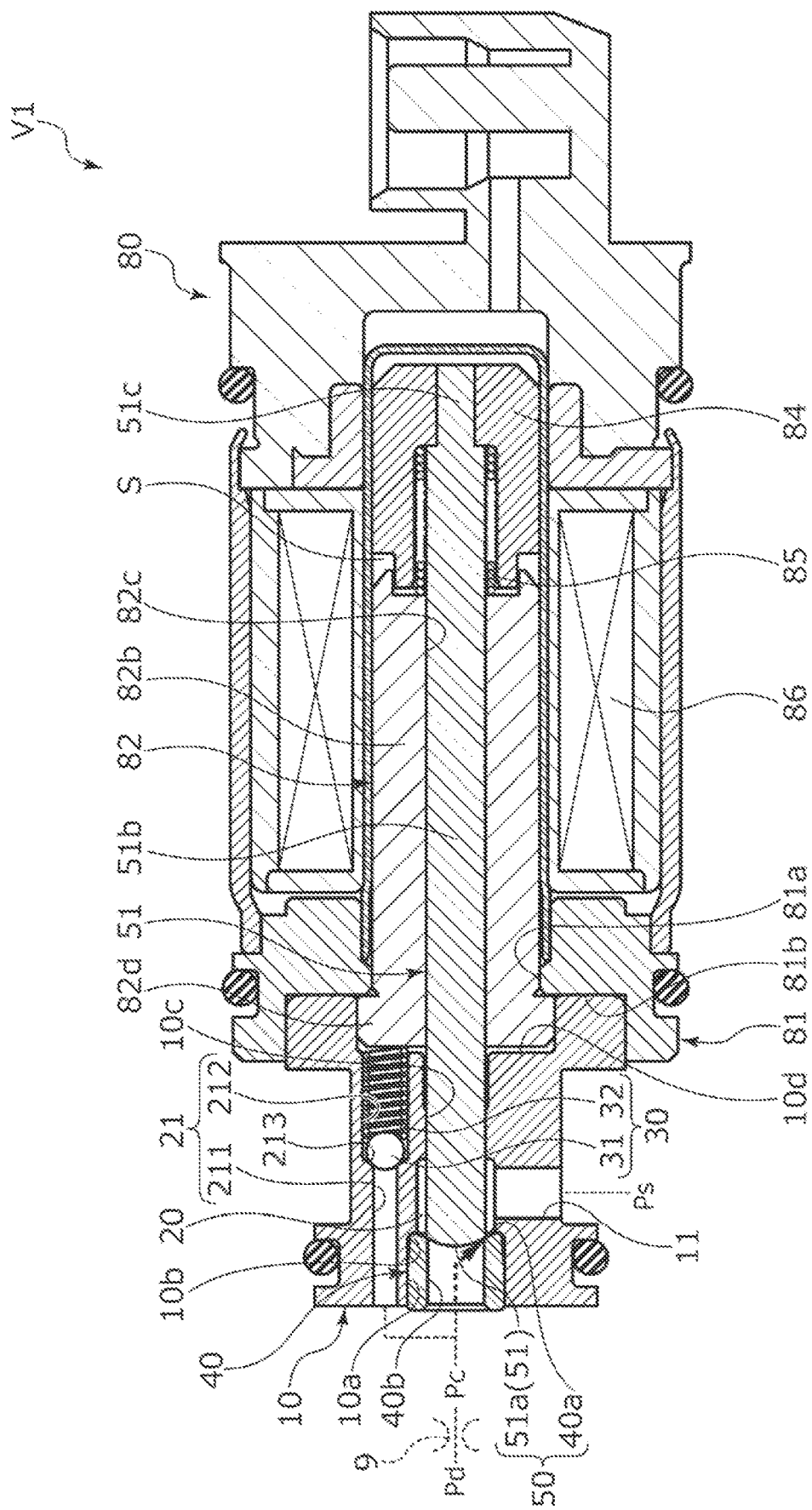
FIG. 2 is a cross-sectional view showing a state where the CS valve is closed in an energized state of the capacity control valve of the first embodiment (e.g., in a normal control state).

As shown in FIGS. 1 and 2, the capacity control valve V1 of the first embodiment assembled into the variable displacement compressor adjusts an electric current that energizes a coil 86 forming the solenoid 80, to perform opening and closing control of a CS valve 50 in the capacity control valve V1, and thus to control the fluid flowing out to the suction chamber from the control chamber and to variably control the control pressure Pc in the control chamber. Incidentally, a discharge fluid of the discharge pressure Pd of the discharge chamber is always supplied to the control chamber via the fixed orifice 9, and the CS valve 50 in the capacity control valve V1 can be closed to increase the control pressure Pc in the control chamber.

In the capacity control valve V1 of the first embodiment, the CS valve 50 includes a CS valve body 51 that is a valve body and a CS valve seat 40a that is a valve seat formed in a valve seat member 40 having a tubular shape and being press-fitted and fixed to a recessed portion 10a of the valve housing 10, and a contact portion 51a formed at an axially left end of the CS valve body 51 comes into contact with and separates from the CS valve seat 40a in an axial direction to open and close the CS valve 50.

Next, a structure of the capacity control valve V1 will be described. As shown in FIGS. 1 and 2, the capacity control valve V1 mainly includes the valve housing 10 and the valve seat member 40 each being made of a metallic material; the CS valve body 51 disposed inside the valve housing 10 so as to be reciprocatable in the axial direction; and the solenoid 80 connected to the valve housing 10 to exert a driving force on the CS valve body 51.

As shown in FIGS. 1 and 2, the CS valve body 51 includes a large-diameter portion 51b that is a columnar body made of a metallic material or a resin material and having a constant cross section, and a small-diameter portion 51c extending from a radially inner side of an axially right end of the large-diameter portion 51b to the right in the axial direction, and also serves as a rod that is disposed to penetrate through the coil 86 of the solenoid 80.

The contact portion 51a having a curved surface shape and bulging out toward the CS valve seat 40a is formed on an axially left end surface of the CS valve body 51, namely, on an axially left end surface of the large-diameter portion 51b. In detail, the curved surface shape of the contact portion 51a is formed by a part of a spherical surface having a constant radius of curvature. Incidentally, the curved surface shape of the contact portion 51a may not be formed by a part of a spherical surface having a constant radius of curvature as long as the contact portion 51a is seatable on the valve seat.

As shown in FIGS. 1 and 2, the solenoid 80 mainly includes a casing 81 including an opening portion 81a that is open to the left in the axial direction; a center post 82 having a substantially cylindrical shape and being inserted into the opening portion 81a of the casing 81 from the left in the axial direction to be disposed between a radially inner side of the casing 81 and a radially inner side of the valve housing 10; the CS valve body 51 which is inserted into the center post 82 so as to be reciprocatable in the axial direction and of which an axially left end portion is disposed inside the valve housing 10; a movable iron core 84 to which the small-diameter portion 51c of the CS valve body 51 is inserted and fixed; a coil spring 85 provided between the center post 82 and the movable iron core 84 to bias the movable iron core 84 in an axially right direction that is a valve opening direction of the CS valve 50; and the coil 86 for excitation wound on an outer side of the center post 82 with a bobbin interposed therebetween.

The center post 82 is made of a rigid body that is a magnetic material such as iron or silicon steel, and includes a cylindrical portion 82b which extends in the axial direction and in which an insertion hole 82c into which the CS valve body 51 is inserted is formed, and a flange portion 82d having an annular shape and extending from an outer peripheral surface of an axially left end portion of the cylindrical portion 82b in a radially outward direction.

As shown in FIGS. 1 and 2, a Ps port 11 that penetrates through the valve housing 10 in the radial direction to communicate with the suction chamber of the variable displacement compressor is formed in the valve housing 10. In addition, the recessed portion 10a into which the valve seat member 40 having a tubular shape is press-fitted from the left in the axial direction is formed on an axially left side of the valve housing 10. Incidentally, the valve seat member 40 is press-fitted and fixed to the recessed portion 10a, so that a Pc port communicating with the control chamber of the variable displacement compressor through a through-hole 40b that penetrates through the valve seat member 40 in the axial direction is formed in the valve housing 10.

A valve chamber 20 is formed inside the valve housing 10, and the contact portion 51a of the CS valve body 51 is disposed in the valve chamber 20 so as to be reciprocatable in the axial direction. In addition, the Ps port 11 extends from an outer peripheral surface of the valve housing 10 in a radially inward direction to communicate with the valve chamber 20.

As described above, inside the valve housing 10, the through-hole 40b of the valve seat member 40, the valve chamber 20, and the Ps port 11 form a flow passage that provides communication between the control chamber and the suction chamber of the variable displacement compressor.

In addition, a guide hole 10c on which an outer peripheral surface of the large-diameter portion 51b of the CS valve body 51 is slidable is formed in an inner peripheral surface of the valve housing 10 on an axially right side of the valve chamber 20 to which the solenoid 80 is attached. Incidentally, an inner peripheral surface of the guide hole 10c and the outer peripheral surface of the large-diameter portion 51b of the CS valve body 51 are slightly separated from each other in a radial direction to form a very small gap therebetween, and the CS valve body 51 is smoothly movable relative to the valve housing 10 in the axial direction.

Figure 3:
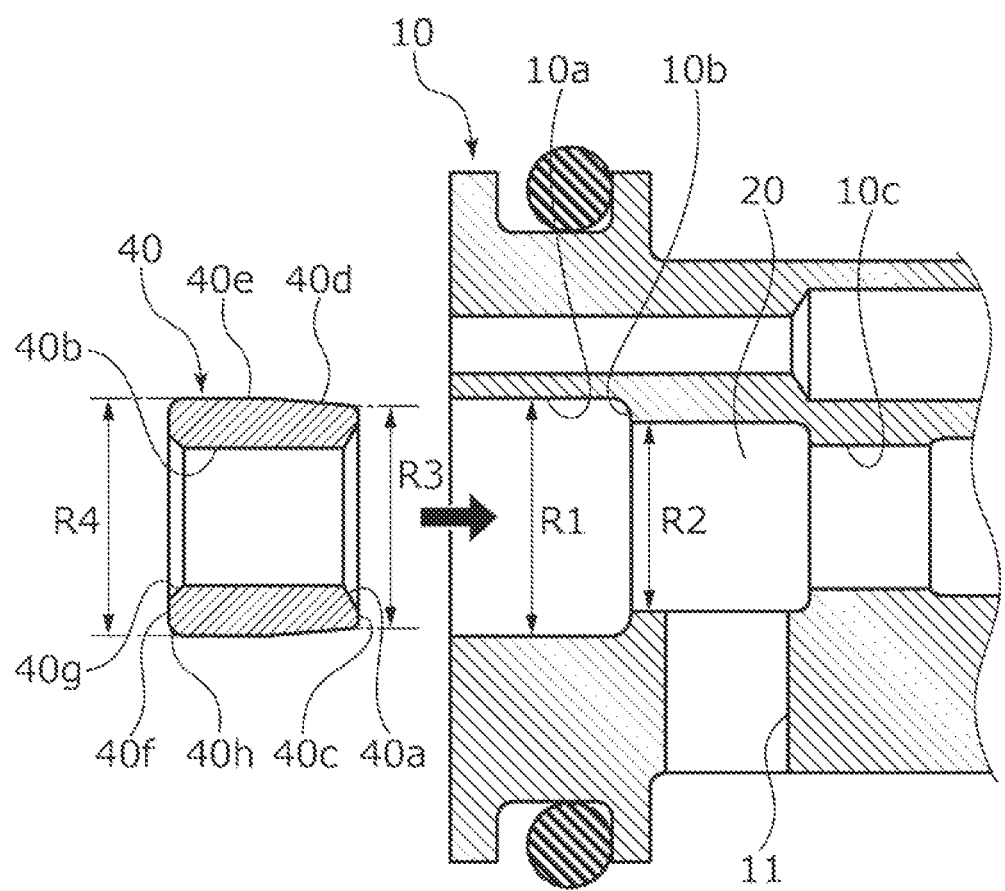
FIG. 3 is a cross-sectional view showing a state where a valve seat member is press-fitted into a valve housing of the capacity control valve of the first embodiment.

As shown in FIG. 3, an inner diameter R1 of the recessed portion 10a of the valve housing 10 is set to be larger than an inner diameter R2 of the valve chamber 20 (i.e., R1>R2), so that a bottom surface of the recessed portion 10a forms a receiving portion 10b with which a flat surface 40c on an axially right side of the valve seat member 40 can be in contact.

In addition, the inner diameter R1 of the recessed portion 10a of the valve housing 10 is set to be larger than an outer diameter R3 of a tip of an insertion end portion 40d of the valve seat member 40 to be described later (i.e., R1>R3), and to be smaller than an outer diameter R4 of a pressure contact end portion 40e of the valve seat member 40 (R1<R4), Incidentally, the outer diameter R4 of the pressure contact end portion 40e of the valve seat member 40 may be the same as the inner diameter R1 of the recessed portion 10a of the valve housing 10 (i.e., R1=R4).

Here, the valve seat member 40 will be described. As shown in FIG. 3, the valve seat member 40 is made of a metallic material harder than a metallic material used for the valve housing 10. Further, the valve seat member 40 may be made of a material that is different from that of the CS valve body 51.

In addition, the valve seat member 40 has a tubular shape in which the through-hole 40b penetrating therethrough in the axial direction is formed. The flat surface 40c having an annular shape, and the CS valve seat 40a having a tapered shape that is continuous with the flat surface 40c from a radially inner side and that is gradually reduced in diameter toward the left in the axial direction are formed at an axially right end portion of the valve seat member 40 from a radially outer side to the radially inner side. In addition, a tapered surface 40g that is continuous from a radially inner side of an end surface 40f having an annular shape and that is gradually reduced in diameter toward the right in the axial direction is formed at an axially left end portion of the valve seat member 40 from the radially outer side to the radially inner side. In addition, the CS valve seat 40a and the tapered surface 40g are formed to be continuous with an inner peripheral surface of the through-hole 40b.

In addition, the insertion end portion 40d having a tapered shape of which an outer peripheral surface is gradually reduced in diameter toward a tip side, namely, toward the right in the axial direction is formed at the axially right end portion of the valve seat member 40. In addition, the pressure contact end portion 40e of which an outer peripheral surface extends parallel to the through-hole 40b is formed at the axially left end portion of the valve seat member 40. Namely, the valve seat member 40 is formed in a tapered shape that is tapered in a direction of press-fitting into the recessed portion 10a of the valve housing 10. Incidentally, a rounded portion 40h having a curved surface shape is formed in an annular shape between the end surface 40f on an axially left side of the valve seat member 40 and an outer peripheral surface of the pressure contact end portion 40e.

Accordingly, when the valve seat member 40 is press-fitted and fixed to the recessed portion 10a of the valve housing 10, the insertion of the valve seat member 40 into the recessed portion 10a is guided by the outer peripheral surface of the insertion end portion 40d having a tapered shape, and axis misalignment of the valve seat member 40 with respect to the valve housing 10 is suppressed, namely, the valve seat member 40 is aligned.

In addition, when the insertion end portion 40d is inserted into the recessed portion 10a, since the diameter of the outer peripheral surface on an axially left side of the insertion end portion 40d is larger than the inner diameter R1 of the recessed portion 10a, the outer peripheral surface of the insertion end portion 40d easily receives contact pressure from an inner peripheral surface of the recessed portion 10a over an entire circumference, so that the valve seat member 40 can be stably press-fitted and fixed to the valve housing 10.

In addition, the flat surface 40c on the axially right side of the insertion end portion 40d is brought into contact with the receiving portion 10b formed of the bottom surface of the recessed portion 10a, in the axial direction, so that the progress of insertion of the valve seat member 40 into the recessed portion 10a can be defined and sealing between the valve housing 10 and the valve seat member 40 can be improved.

As shown in FIGS. 1 and 2, a recessed portion 10d that is recessed to the left in the axial direction is formed on the axially right side of the valve housing 10, the flange portion 82d of the center post 82 is inserted from the right in the axial direction to be fixed to the valve housing 10 in a substantially sealed state, and the casing 81 is inserted from the right in the axial direction to be fixed to the valve housing 10 in a substantially sealed state, so that the valve housing 10, the center post 82, and the casing 81 are integrally connected to each other.

As described above, in a state where the valve housing 10, the center post 82, and the casing 81 are integrally connected to each other, an axially right end surface of the valve housing 10 and a side surface on an axially right side of the flange portion 82d of the center post 82 are in contact with a bottom surface of a recessed portion 81b formed on an axially left side of the casing 81, and a bottom surface of the recessed portion 10d of the valve housing 10 and an axially left end surface of the center post 82 are separated from each other in the axial direction to form a gap therebetween.

In addition, a through-hole 21 extending between an axially left end surface of the valve housing 10 and a bottom portion of the recessed portion 10d in the axial direction is formed in the valve housing 10. The through-hole 21 includes a small-diameter hole portion 211 of which an axially left end communicates with the control chamber of the variable displacement compressor, and a large-diameter hole portion 212 having a diameter larger than that of the small-diameter hole portion 211 and extending continuously from an axially right end of the small-diameter hole portion 211. An axially right end of the large-diameter hole portion 212 is open to the gap formed between the bottom surface of the recessed portion 10d and the axially left end surface of the center post 82. Incidentally, the control fluid of the control pressure Pc is supplied from the control chamber of the variable displacement compressor into the small-diameter hole portion 211 of the through-hole 21 and into the through-hole 40b of the valve seat member 40.

An actuating valve body 31 having a ball shape, and a return spring 32 of which an axially right end is fixed to the axially left end surface of the center post 82 and of which an axially left end is in contact with the actuating valve body 31 from the right in the axial direction are disposed in the large-diameter hole portion 212 of the through-hole 21, and the actuating valve body 31 is biased to the left in the axial direction by the return spring 32. The actuating valve body 31 and the return spring 32 form a pressure-actuated valve 30 that controls communication between the control chamber of the variable displacement compressor and an internal space S of the casing 81 in the through-hole 21.

Although not shown for convenience of description, when the control pressure Pc is high, the actuating valve body 31 of the pressure-actuated valve 30 moves to the right in the axial direction against a biasing force of the return spring 32 and against the pressure of the fluid in the internal space S of the casing 81, to be separated from a valve seat 213 having a tapered shape and being formed at a connecting portion between the axially right end of the small-diameter hole portion 211 and an axially left end of the large-diameter hole portion 212 in the through-hole 21, so that the pressure-actuated valve 30 is opened. Accordingly, the control chamber of the variable displacement compressor and the internal space S of the casing 81 communicate with each other via the through-hole 21, the control fluid of the control pressure Pc is supplied from the control chamber of the variable displacement compressor to the internal space S of the casing 81 through the through-hole 21, and a pressure difference between the control pressure Pc of the control chamber of the variable displacement compressor and the pressure of the fluid in the internal space S of the casing 81 is decreased. Therefore, the influence of a force induced by the control pressure Pc of the control fluid in the through-hole 40b of the valve seat member 40 which acts on the CS valve body 51 is decreased, so that the CS valve body 51 can be smoothly operated to the left in the axial direction, namely, in a valve closing direction, and responsiveness to high output control of the variable displacement compressor can be improved.

Incidentally, in the valve housing 10, since the very small gap between the inner peripheral surface of the guide hole 10c and the outer peripheral surface of the large-diameter portion 51b of the CS valve body 51 functions as a throttle, the fluid in the internal space S of the casing 81 can be gently released to the Ps port 11, and the state where the pressure difference between the pressure of the fluid in the valve chamber 20 and the pressure of the fluid in the internal space S of the casing 81 is small is maintained when not used for a long time.

As described above, in the capacity control valve V1 of the present embodiment, the valve seat member 40 having a tubular shape is press-fitted into the valve housing 10, the valve seat member 40 including the CS valve seat 40a on which the CS valve body 51 is seatable and having a hardness higher than that of the valve housing 10, and the valve seat member 40 including the CS valve seat 40a requiring wear resistance is configured separately from the valve housing 10, so that the degree of freedom in the processing and the shape of the CS valve seat 40a is increased, and since the valve seat member 40 is made of a hard material harder than that of the valve housing 10, the valve housing 10 can be made of a low-cost material, so that the capacity control valve V1 can be produced with good workability and at a low cost.

In addition, since the recessed portion 10a having a large diameter is formed at the axially left end portion of the valve housing 10, a jig used for boring, for example, a cutting tool having high rigidity can be used to improve workability, so that the valve chamber 20 having a diameter smaller than that of the recessed portion 10a can be easily formed and the guide hole 10c can be formed to have a small diameter. For this reason, the gap between the inner peripheral surface of the guide hole 10c and the outer peripheral surface of the large-diameter portion 51b of the CS valve body 51 can be formed smaller, the leakage amount of the fluid can be reduced, and foreign matter resistance can be increased.

In addition, when the valve seat member 40 is press-fitted and fixed to the recessed portion 10a of the valve housing 10, since the insertion of the valve seat member 40 into the recessed portion 10a is guided by the outer peripheral surface of the insertion end portion 40d having a tapered shape and axis misalignment of the valve seat member 40 with respect to the valve housing 10 is suppressed, even in a case where the processing accuracy of the recessed portion 10a is bad, if the processing accuracy of the CS valve seat 40a of the valve seat member 40 and the accuracy of press-fitting are high, an axis of the valve seat member 40 can be accurately aligned with the CS valve body 51. Further, since the movement of the valve seat member 40 relative to the valve housing 10 is prevented by the press-fitting and fixing of the valve seat member 40 to the recessed portion 10a, the state where the axis is accurately aligned with the CS valve body 51 is maintained.

In addition, when the valve seat member 40 is press-fitted and fixed to the recessed portion 10a of the valve housing 10, the inner peripheral surface of the recessed portion 10a of the valve housing 10 is plastically deformed while being expanded, and easily bulges out to the radially inner side along the rounded portion 40h having a curved surface shape on the axially left side of the pressure contact end portion 40e, so that the valve seat member 40 can be prevented from coming off without using a separate member.

In addition, since the tapered surface 40g that is continuous with the through-hole 40b is formed at the axially left end portion of the valve seat member 40, the fluid is easily introduced into the through-hole 40b of the valve seat member 40 from the control chamber.

In addition, since the valve seat member 40 and the CS valve body 51 are made of different materials, the CS valve seat 40a of the valve seat member 40 and the contact portion 51a of the CS valve body 51 do not stick to each other, so that mutual wear can be suppressed.

In addition, since the contact portion 51a of the CS valve body 51 that comes into contact with the CS valve seat 40a is formed by a part of a spherical surface having a constant radius of curvature, even when axis misalignment is generated at the valve seat member 40 that is press-fitted and fixed to the valve housing 10, the contact portion 51a of the CS valve body 51 is reliably seatable on the CS valve seat 40a, so that the leakage amount of the fluid at the CS valve 50 can be reduced.

Figure 4:
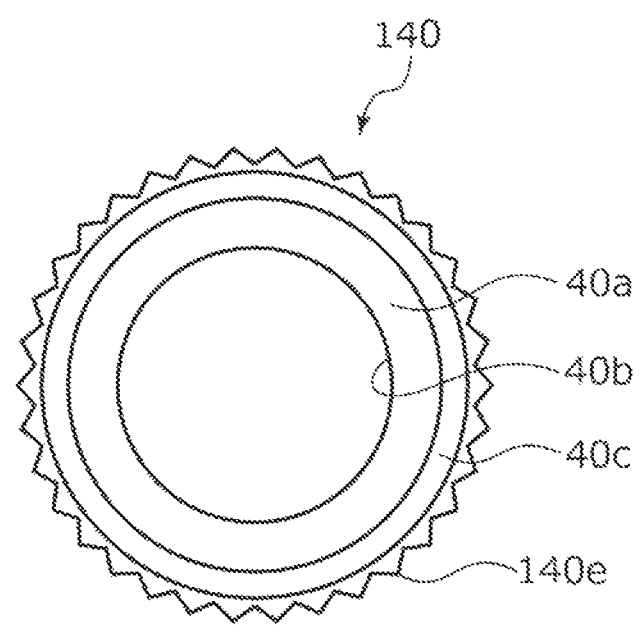
FIG. 4 is a front view showing a modification example of the valve seat member.

Incidentally, as a modification example of the valve seat member, as shown in FIG. 4, in a valve seat member 140, recesses and protrusions each having a triangular shape are formed in an outer peripheral surface of a pressure contact end portion 140e extending parallel to the through-hole 40b, so that when the valve seat member 140 is press-fitted and fixed to the recessed portion 10a of the valve housing 10, a plurality of the recesses and protrusions on the outer peripheral surface of the pressure contact end portion 140e bite into the inner peripheral surface of the recessed portion 10a. Therefore, the axis attachment accuracy of the valve seat member 140 can be improved and the rotation of the valve seat member 140 with respect to the valve housing 10 can be prevented. Incidentally, the recesses and protrusions may be not only formed on the outer peripheral surface of the pressure contact end portion, but also formed to the middle of a tapered outer peripheral surface of an insertion end portion that is continuous with the outer peripheral surface of the pressure contact end portion. In addition, the recesses and protrusions may not be formed to the position of an axially left end of the pressure contact end portion. In addition, the recesses and protrusions may be formed in a quadrilateral shape, a curved shape, etc. Incidentally, the undulating shape in the modification example is applicable to a valve seat member of each of the following embodiments.

Second Embodiment

A capacity control valve according to a second embodiment of the present invention will be described with reference to FIG. 5. Incidentally, a description of duplicated configurations that are the same as the configurations of the first embodiment will be omitted.

Figure 5:
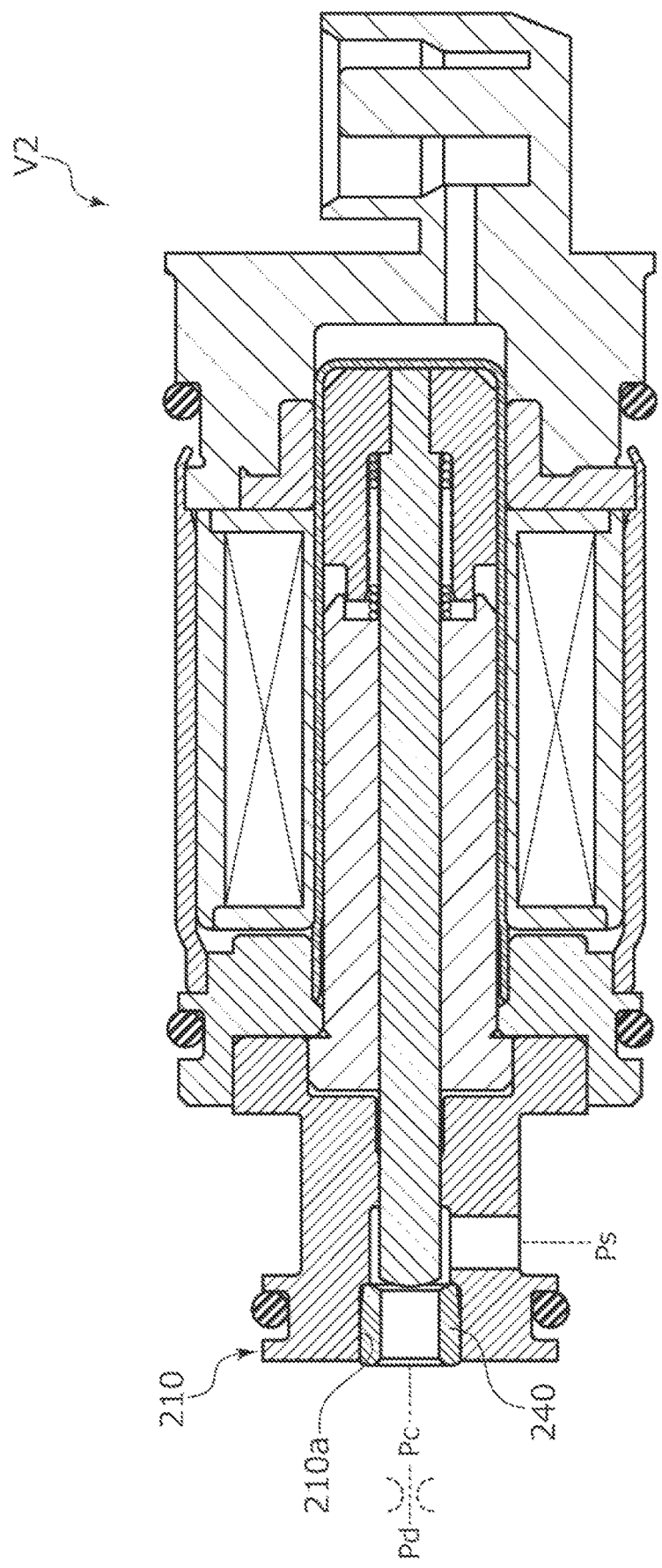
FIG. 5 is a cross-sectional view showing a state where a CS valve is opened in a non-energized state of a capacity control valve according to a second embodiment of the present invention.

As shown in FIG. 5, in a capacity control valve V2 according to the second embodiment of the present invention, a valve seat member 240 having substantially the same configuration as that of the first embodiment is press-fitted and fixed to a recessed portion 210a of a valve housing 210. Incidentally, the capacity control valve V2 does not have the configuration of the pressure-actuated valve 30 (refer to FIGS. 1 and 2) of the first embodiment, and as described above, the configuration of using the valve seat member is applicable to valve housings of capacity control valves of various types.

Third Embodiment

A capacity control valve according to a third embodiment of the present invention will be described with reference to FIG. 6. Incidentally, a description of duplicated configurations that are the same as the configurations of the first and second embodiments will be omitted. Incidentally, although a detailed description will be omitted, in the third and subsequent embodiments, it is needless to say that a configuration of each variable displacement compressor is also different from those of the first and second embodiments depending on a configuration of each capacity control valve.

Figure 6:
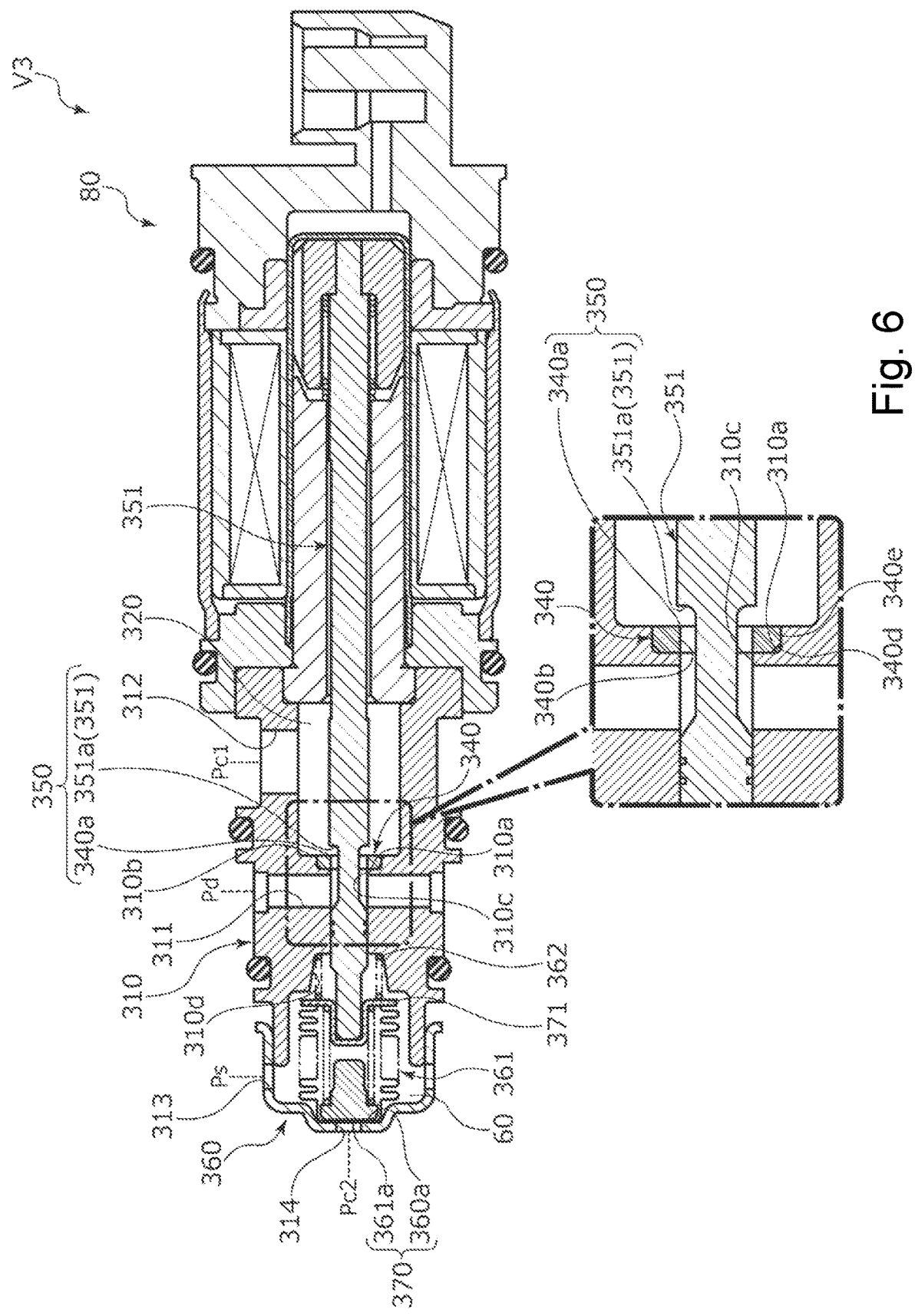
FIG. 6 is a cross-sectional view showing a state where a CS valve is opened in a non-energized state of a capacity control valve according to a third embodiment of the present invention.

As shown in FIG. 6, in a capacity control valve V3 according to the third embodiment of the present invention, a DC valve 350 includes a DC valve body 351 that is a valve body and a DC valve seat 340a that is a valve seat formed in a valve seat member 340 that is press-fitted and fixed to a recessed portion 310a of a valve housing 310, and a contact portion 351a of the DC valve body 351 comes into contact with and separates from the DC valve seat 340a in an axial direction to open and close the DC valve 350.

The capacity control valve V3 mainly includes the valve housing 310 and the valve seat member 340 each being made of a metallic material; the DC valve body 351 disposed inside the valve housing 310 so as to be reciprocatable in the axial direction; and the solenoid 80 connected to the valve housing 310 to exert a driving force on the DC valve body 351.

A Pd port 311 communicating with the discharge chamber of the variable displacement compressor and a first Pc port 312 communicating with the control chamber of the variable displacement compressor are formed in the valve housing 310. In addition, in a liquid refrigerant discharge valve seat member 360 having a cup shape and being inserted and fixed to an axially left end portion of the valve housing 310, a Ps port 313 penetrating through the liquid refrigerant discharge valve seat member 360 in the radial direction and communicating with the suction chamber of the variable displacement compressor, and a second Pc port 314 penetrating through the liquid refrigerant discharge valve seat member 360 in the axial direction and communicating with the control chamber of the variable displacement compressor are formed.

In an annular protrusion portion 310b having a rectangular shape in a cross-sectional view and protruding from an inner peripheral surface of the valve housing 310 to a radially inner side, a guide hole 310c penetrating through the annular protrusion portion 310b in the axial direction is formed, and the recessed portion 310a is formed which is recessed from a radially inner side of a side surface on an axially right side of the annular protrusion portion 310b to the left in the axial direction and into which the valve seat member 340 having a tubular shape is press-fitted from the right in the axial direction.

A valve chamber 320 is formed inside the valve housing 310, and the contact portion 351a of the DC valve body 351 is disposed in the valve chamber 320 so as to be reciprocatable in the axial direction, the contact portion 351a being formed in a curved surface shape. In addition, the first Pc port 312 extends from an outer peripheral surface of the valve housing 310 in a radially inward direction to communicate with the valve chamber 320. In addition, the Pd port 311 extends from the outer peripheral surface of the valve housing 310 in the radially inward direction to communicate with the guide hole 310c.

As described above, inside the valve housing 310, the Pd port 311, the guide hole 310c, a through-hole 340b of the valve seat member 340 to be described later, the valve chamber 320, and the first Pc port 312 form a flow passage that provides communication between the discharge chamber and the control chamber of the variable displacement compressor.

The valve seat member 340 is made of a metallic material harder than a metallic material used for the valve housing 310. Further, the valve seat member 340 may be made of a material that is different from that of the DC valve body 351.

In addition, the valve seat member 340 has a tubular shape in which the through-hole 340b penetrating therethrough in the axial direction is formed. In addition, the DC valve seat 340a is formed of an inner corner on an axially right side of the valve seat member 340.

In addition, an insertion end portion 340d having a tapered shape of which an outer peripheral surface is gradually reduced in diameter toward a tip side, namely, toward the left in the axial direction is formed at an axially left end portion of the valve seat member 340. In addition, a pressure contact end portion 340e of which an outer peripheral surface extends parallel to the through-hole 340b is formed at an axially right end portion of the valve seat member 340.

Accordingly, in the capacity control valve V3 of the third embodiment, the valve seat member 340 having a tubular shape is press-fitted into the valve housing 310, the valve seat member 340 including the DC valve seat 340a on which the DC valve body 351 is seatable and having a hardness higher than that of the valve housing 310, and the valve seat member 340 including the DC valve seat 340a requiring wear resistance is configured separately from the valve housing 310, so that the degree of freedom in the processing and the shape of the DC valve seat 340a is increased, and since the valve seat member 340 is made of a hard material harder than that of the valve housing 310, the valve housing 310 can be made of a low-cost material, so that the capacity control valve V3 can be produced with good workability and at a low cost.

In addition, since the contact portion 351a of the DC valve body 351 that comes into contact with the DC valve seat 340a is formed in a curved surface shape and being recessed opposite to the DC valve seat 340a in the axial direction, even when axis misalignment is generated at the valve seat member 340 that is press-fitted and fixed to the valve housing 310, the contact portion 351a of the DC valve body 351 is reliably seatable on the DC valve seat 340a, so that the leakage amount of the fluid at the DC valve 350 can be reduced.

Incidentally, unlike the first and second embodiments each including the CS valve, in the capacity control valve V3, a flow passage between the Pd port 311 and the first Pc port 312 is opened and closed by the DC valve 350, and as described above, the configuration of using the valve seat member is applicable to valve housings of capacity control valves of various types.

In addition, the capacity control valve V3 is provided with a liquid refrigerant discharge valve 370. The liquid refrigerant discharge valve 370 includes a pressure sensitive body 361 that is provided in a pressure sensitive chamber 60 formed between a recessed portion 310d formed at the axially left end portion of the valve housing 310 and the liquid refrigerant discharge valve seat member 360, and a liquid refrigerant discharge valve seat 360a formed in an inner surface of the liquid refrigerant discharge valve seat member 360, and an axially left end 361a of the pressure sensitive body 361 comes into contact with and separates from the liquid refrigerant discharge valve seat 360a in the axial direction to open and close the liquid refrigerant discharge valve 370.

In addition, a coil spring 362 is provided between a bottom surface of the recessed portion 310d of the valve housing 310 and an adapter 371 fixed to an axially right end portion of the pressure sensitive body 361, The coil spring 362 presses the axially left end 361a of the pressure sensitive body 361 toward the liquid refrigerant discharge valve seat 360a by means of an elastic restoring force regardless of the expansion and contraction of the pressure sensitive body 361, and during normal control, the liquid refrigerant discharge valve 370 is prevented from being opened.

In addition, the liquid refrigerant discharge valve 370 is opened when a force induced by the control pressure Pc supplied from the second Pc port 314 formed in the liquid refrigerant discharge valve seat member 360 is greater than a biasing force of the coil spring 362. Specifically, when the variable displacement compressor is stopped and then left in a stopped state for a long time, the suction pressure Ps, the discharge pressure Pd, and the control pressure Pc are equalized, and the control pressure Pc and the suction pressure Ps are much higher than the control pressure Pc and the suction pressure Ps at the time of continuous driving, so that the fluid in the control chamber may be partially liquefied. Since the control pressure Pc is much higher when the variable displacement compressor is started up from this state than at the time of continuous driving, and the liquefied fluid makes it difficult for the control chamber to obtain a maximum capacity, at the start-up of the variable displacement compressor, the liquid refrigerant discharge valve 370 is opened by the control pressure Pc, the second Pc port 314 and the Ps port 313 communicate with each other, and the liquefied fluid is discharged from the control chamber to the suction chamber within a short time, so that responsiveness at the start-up of the variable displacement compressor can be improved.

Fourth Embodiment

A capacity control valve according to a fourth embodiment of the present invention will be described with reference to FIG. 7. Incidentally, a description of duplicated configurations that are the same as the configurations of the third embodiment will be omitted.

Figure 7:
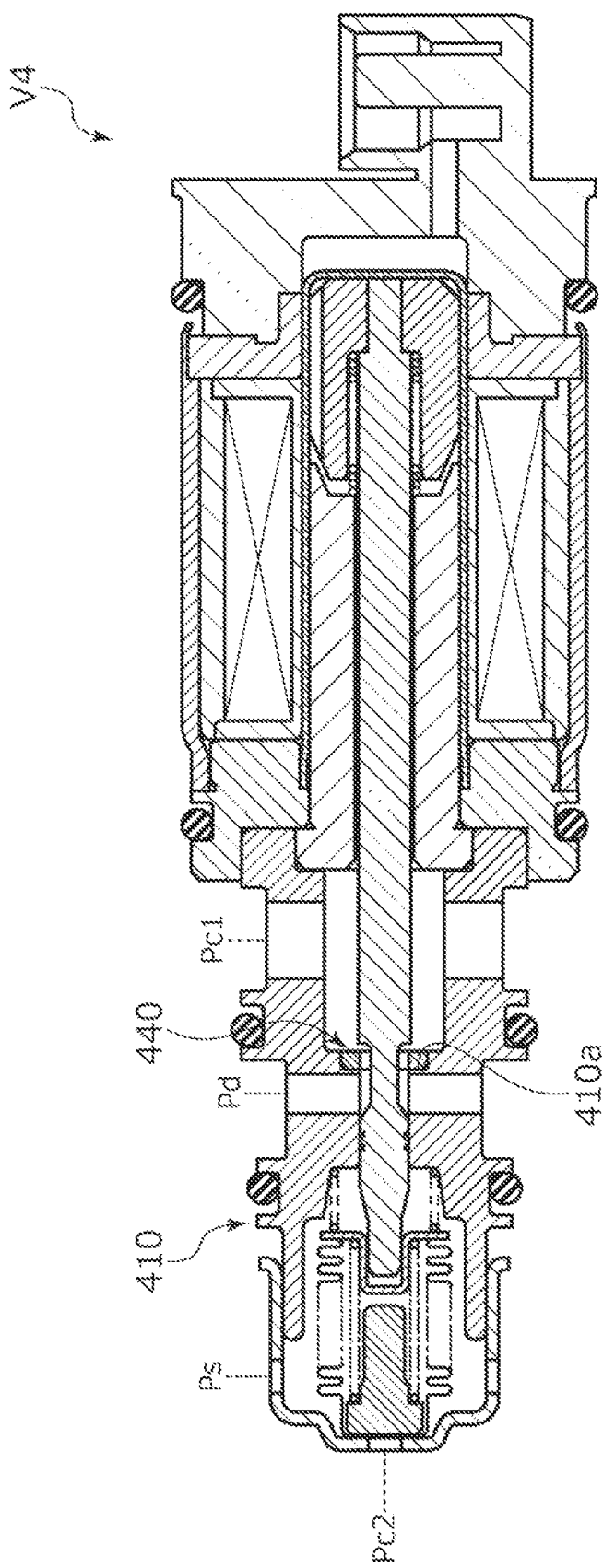
FIG. 7 is a cross-sectional view showing a state where a CS valve is opened in a non-energized state of a capacity control valve according to a fourth embodiment of the present invention.

As shown in FIG. 7, in a capacity control valve V4 according to the fourth embodiment of the present invention, a valve seat member 440 having substantially the same configuration as that of the third embodiment is press-fitted and fixed to a recessed portion 410a of a valve housing 410. Incidentally, the capacity control valve V4 is a capacity control valve larger than the capacity control valve V3 of the third embodiment, and the configuration of using the valve seat member is applicable to valve housings of capacity control valves of various sizes.

Fifth Embodiment

A capacity control valve according to a fifth embodiment of the present invention will be described with reference to FIG. 8. Incidentally, a description of duplicated configurations that are the same as the configurations of the first embodiment will be omitted.

Figure 8:
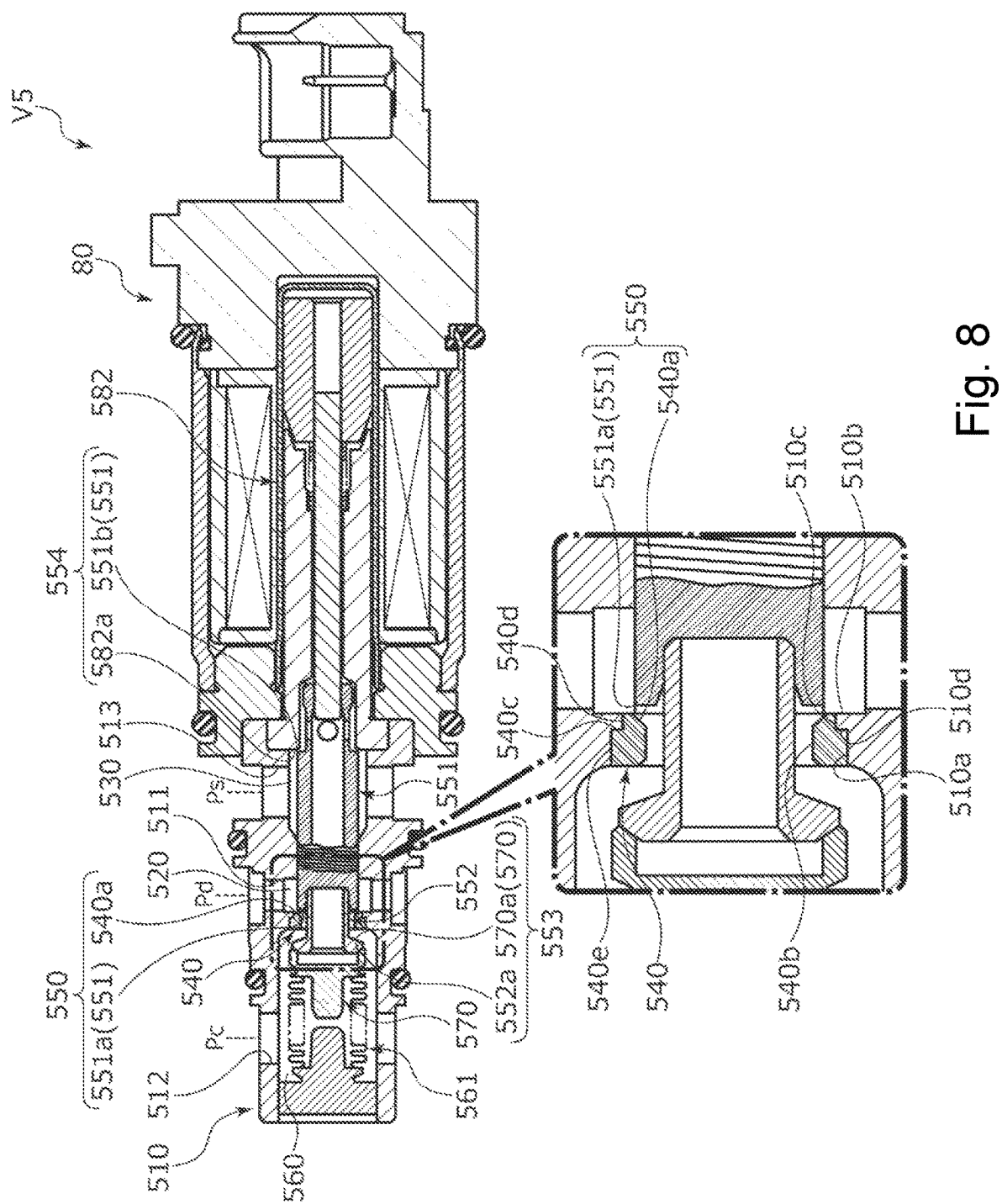
FIG. 8 is a cross-sectional view showing a state where a CS valve is opened in a non-energized state of a capacity control valve according to a fifth embodiment of the present invention.

As shown in FIG. 8, in a capacity control valve V5 according to the fifth embodiment of the present invention, a main valve 550 includes a main and auxiliary valve body 551 that is a valve body and a main valve seat 540a that is a valve seat formed in a valve seat member 540 that is press-fitted and fixed to a recessed portion 510a of a valve housing 510, and a contact portion 551a formed of an outer corner at an axially left end of the main and auxiliary valve body 551 comes into contact with and separates from the main valve seat 540a in an axial direction to open and close the main valve 550. An auxiliary valve 554 includes the main and auxiliary valve body 551 and an auxiliary valve seat 582a that is formed in an axially left end surface of a fixed iron core 582, and a step portion 551b on an axially right side of the main and auxiliary valve body 551 comes into contact with and separates from the auxiliary valve seat 582a to open and close the auxiliary valve 554. A pressure sensitive valve 553 includes an adapter 570 of a pressure sensitive body 561 and a pressure sensitive valve seat 552a that is formed at an axially left end of a pressure sensitive valve member 552, and an axially right end 570a of the adapter 570 comes into contact with and separates from the pressure sensitive valve seat 552a to open and close the pressure sensitive valve 553.

The capacity control valve V5 mainly includes the valve housing 510 and the valve seat member 540 each being made of a metallic material; the main and auxiliary valve body 551 and the pressure sensitive valve member 552 that are disposed inside the valve housing 510 so as to be reciprocatable in the axial direction; the pressure sensitive body 561 that applies a biasing force to the main and auxiliary valve body 551 and to the pressure sensitive valve member 552 to the right in the axial direction according to a fluid pressure therearound; and the solenoid 80 connected to the valve housing 510 to exert a driving force on the main and auxiliary valve body 551 and on the pressure sensitive valve member 552.

A Pd port 511 communicating with the discharge chamber of the variable displacement compressor, a Pc port 512 communicating with the control chamber of the variable displacement compressor, and a Ps port 513 communicating with the suction chamber of the variable displacement compressor are formed in the valve housing 510.

A through-hole 510c penetrating through the annular protrusion portion 510b in the axial direction is formed in an annular protrusion portion 510b having a rectangular shape in a cross-sectional view and protruding from an inner peripheral surface of the valve housing 510 to a radially inner side, and the recessed portion 510a is formed which is recessed from a radially inner side of a side surface on an axially left side of the annular protrusion portion 510b to the right in the axial direction and into which the valve seat member 540 having a tubular shape is press-fitted from the left in the axial direction. A receiving portion 510d that is formed at an axially right end portion of the valve seat member 540 and that can be in contact with a step portion 540c is formed in a bottom surface of the recessed portion 510a.

A main valve chamber 520 which communicates with the Pd port 511 and in which the contact portion 551a of the main and auxiliary valve body 551 is disposed, an auxiliary valve chamber 530 which communicates with the Ps port 513 and in which a back pressure side of the main and auxiliary valve body 551, namely, the step portion 551b on the axially right side of the main and auxiliary valve body 551 is disposed, and a pressure sensitive chamber 560 which communicates with the Pc port 512 and in which the pressure sensitive valve member 552 and the pressure sensitive body 561 are disposed are formed inside the valve housing 510.

As described above, inside the valve housing 510, the Pd port 511, the main valve chamber 520, the through-hole 510c, a through-hole 540b of the valve seat member 540 to be described later, the pressure sensitive chamber 560, and the Pc port 512 form a flow passage that provides communication between the discharge chamber and the control chamber of the variable displacement compressor.

The valve seat member 540 is made of a metallic material harder than a metallic material used for the valve housing 510. Further, the valve seat member 540 may be made of a material that is different from that of the main and auxiliary valve body 551.

In addition, the valve seat member 540 has a tubular shape in which the through-hole 540b penetrating therethrough in the axial direction is formed. The main valve seat 540a having a tapered shape is formed of an axially right end surface of the valve seat member 540.

In addition, an insertion end portion 540d having a small diameter of which an outer peripheral surface extends parallel to the through-hole 540b is formed at the axially right end portion of the valve seat member 540. In addition, a pressure contact end portion 540e having a large diameter of which an outer peripheral surface extends parallel to the through-hole 540b is formed at an axially left end portion of the valve seat member 540. Accordingly, the step portion 540c is formed at the axially right end portion of the valve seat member 540 by the outer peripheral surface of and a side surface on an axially right side of the pressure contact end portion 540e and by the outer peripheral surface of the insertion end portion 540d. Namely, the step portion 540c is formed on a radially outer side of the insertion end portion 540d.

Accordingly, in the capacity control valve V5 of the fifth embodiment, the valve seat member 540 having a tubular shape is press-fitted into the valve housing 510, the valve seat member 540 including the main valve seat 540a on which the main and auxiliary valve body 551 is seatable and having a hardness higher than that of the valve housing 510, and the valve seat member 540 including the main valve seat 540a requiring wear resistance is configured separately from the valve housing 510, so that the degree of freedom in the processing and the shape of the main valve seat 540a is increased, and since the valve seat member 540 is made of a hard material harder than that of the valve housing 510, the valve housing 510 can be made of a low-cost material, so that the capacity control valve V5 can be produced with good workability and at a low cost.

In addition, since the contact portion 551a of the main and auxiliary valve body 551 that comes into contact with the main valve seat 540a is formed in a curved surface shape and bulging out toward the main valve seat 540a, even when axis misalignment is generated at the valve seat member 540 that is press-fitted and fixed to the valve housing 510, the contact portion 551a of the main and auxiliary valve body 551 is reliably seatable on the main valve seat 540a, so that the leakage amount of the fluid at the main valve 550 can be reduced.

In addition, when the valve seat member 540 is press-fitted and fixed to the recessed portion 510a of the valve housing 510, the step portion 540c is brought into contact with the receiving portion 510d formed of the bottom surface of the recessed portion 510a, in the axial direction, so that the progress of insertion of the valve seat member 540 into the recessed portion 510a can be defined and sealing between the valve housing 510 and the valve seat member 540 can be improved.

Incidentally, unlike the first and second embodiments each including the CS valve, in the capacity control valve V5, a flow passage between the Pd port 511 and the Pc port 512 is opened and closed by the main valve 550, and as described above, the configuration of using the valve seat member is applicable to valve housings of capacity control valves of various types. In addition, the capacity control valve V5 is different from the capacity control valves V3 and V4 of the third and fourth embodiments in the shape of the valve housing, the disposition of the ports, etc., and as described above, the configuration of using the valve seat member is applicable to valve housings of various shapes.

Sixth Embodiment

A capacity control valve according to a sixth embodiment of the present invention will be described with reference to FIG. 9. Incidentally, a description of duplicated configurations that are the same as the configurations of the first embodiment will be omitted.

Figure 9:
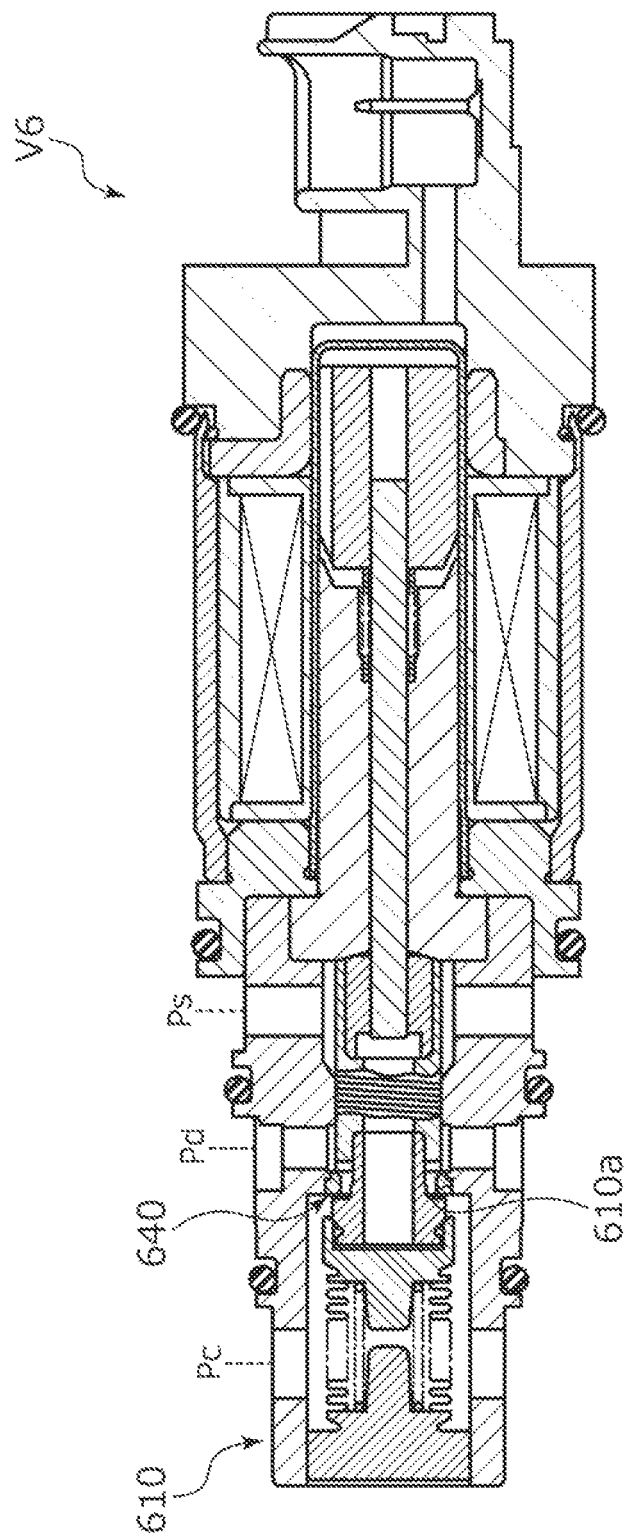
FIG. 9 is a cross-sectional view showing a state where a CS valve is opened in a non-energized state of a capacity control valve according to a sixth embodiment of the present invention.

As shown in FIG. 9, in a capacity control valve V6 according to the sixth embodiment of the present invention, a valve seat member 640 having substantially the same configuration as that of the fifth embodiment is press-fitted and fixed to a recessed portion 610a of a valve housing 610. Incidentally, the capacity control valve V6 is a capacity control valve larger than the capacity control valve V5 of the fifth embodiment, and the configuration of using the valve seat member is applicable to valve housings of capacity control valves of various sizes.

The embodiments of the present invention have been described above with reference to the drawings; however, the specific configurations are not limited to the embodiments, and changes or additions that are made without departing from the scope of the present invention are also included in the present invention.

For example, in the embodiments, the valve housing and the valve seat member have been described as being made of a metallic material; however, the present invention is not limited thereto, and the valve seat member may be made of a resin material, etc, as long as the valve seat member has a hardness higher than that of a flow passage inner side of the valve housing. In addition, also in this case, it is preferable that the valve seat member is made of a material which is different from that of the valve body.

In addition, the valve seat member may be harder than the flow passage inner side of the valve housing, and portions other than the flow passage inner side of the valve housing may be harder than the valve seat member.

In addition, at least the valve seat of the valve seat member may be harder than the valve housing, and the valve seat member may not be formed of one member.

In addition, the contact portion of the valve body that comes into contact with the valve seat may not be formed in a curved surface shape.

In addition, a receiving portion that receives the insertion end portion of the valve seat member may not be formed in the valve housing.

In addition, a rounded portion may also be formed in the valve seat members of the third to sixth embodiments as in the valve seat members of the first and second embodiments, so that each of the valve seat members can be prevented from coming off by press-fitting and fixing without using a separate member.

In addition, in the embodiments, the valve seat member has been described as being press-fitted and fixed by using a difference in radial dimension between the valve seat member and the housing; however, the present invention is not limited thereto, and the valve seat member may be fixed to the valve housing by inserting the valve seat member into the valve housing and by caulking the valve housing (for example, in FIG. 1, a force may be applied to the valve seat member in the radial direction to fix the valve seat member, by caulking a left end surface of the valve housing in the axial direction and by deforming the valve housing in the radial direction).

REFERENCE SIGNS LIST

9 Fixed orifice
10 Valve housing
10a Recessed portion
10b Receiving portion
10c Guide hole
10d Recessed portion
11 Ps port
20 Valve chamber
21 Through-hole
30 Pressure-actuated valve
40 Valve seat member
40a CS valve seat (valve seat)
40b Through-hole
40c Flat surface
40d Insertion end portion
40e Pressure contact end portion
40f End surface
40g Tapered surface
40h Rounded portion
50 CS valve
51 CS valve body (valve body)
51a Contact portion
80 Solenoid
140 Valve seat member
140e Pressure contact end portion
S Space
V1 to V6 Capacity control valve

The invention claimed is:

1. A capacity control valve comprising:
a valve housing in which a flow passage is formed; and
a valve body disposed inside the valve housing and driven by a solenoid,
wherein a valve seat member having a tubular shape and including a valve seat on which the valve body is seatable is press-fitted into the valve housing,
an outer peripheral surface of the valve seat member has a tapered surface that is tapered in a direction of press-fitting of the valve seat member into the valve housing, at least the valve seat of the valve seat member is harder than the valve housing, wherein the valve housing is provided with a receiving portion that receives an insertion end portion of the valve seat member, the receiving portion is formed by an inner peripheral surface of the valve housing and has an inner diameter which becomes smaller toward a bottom of the receiving portion, and the insertion end portion of the valve seat member has an end surface which is on a leading edge in the direction of press-fitting of the valve seat member and which is brought into contact with the receiving portion.

2. The capacity control valve according to claim 1, wherein the valve body has a contact portion that comes into contact with the valve seat and that has a curved surface shape.

3. The capacity control valve according to claim 2, wherein the contact portion of the valve body is a part of a spherical surface having a constant radius of curvature.

* * * * *